(12) United States Patent
Handschuh et al.

(10) Patent No.: US 6,276,249 B1
(45) Date of Patent: Aug. 21, 2001

(54) SAW BLADE

(75) Inventors: Herbert Handschuh, Neckarteilfingen; Albert Schweizer, Aichtal; Hilmar Gehrmann, Ennepetal, all of (DE)

(73) Assignee: Handschuh & Scheider GmbH, Nürtingen (DE)

( * ) Notice: Subject to any disclaimer, the term of this patent is extended or adjusted under 35 U.S.C. 154(b) by 0 days.

(21) Appl. No.: 09/194,923

(22) PCT Filed: Apr. 4, 1997

(86) PCT No.: PCT/DE97/00695

§ 371 Date: Dec. 4, 1998

§ 102(e) Date: Dec. 4, 1998

(87) PCT Pub. No.: WO98/45076

PCT Pub. Date: Oct. 15, 1998

(51) Int. Cl.⁷ .................................................. B23D 57/00
(52) U.S. Cl. ................................ 83/851; 83/846; 83/848; 83/854
(58) Field of Search ............................. 83/851, 846, 848, 83/854

(56) References Cited

U.S. PATENT DOCUMENTS

| 2,422,111 | * | 6/1947 | Lundberg | 83/851 |
| 4,011,783 | * | 3/1977 | Modley | 83/846 |
| 4,173,914 | * | 11/1979 | Vollmer et al. | 83/848 |
| 4,604,933 | | 8/1986 | Lesher et al. . | |
| 4,640,172 | * | 2/1987 | Kullmann et al. | 83/851 |
| 5,425,296 | * | 6/1995 | Kullmann et al. | 83/846 |
| 5,477,763 | * | 12/1995 | Kullman | 83/846 |

FOREIGN PATENT DOCUMENTS

| 286586 | * | 10/1952 | (CH) | 83/851 |
| 640987 | * | 8/1934 | (DE) | 83/851 |
| 3934872A1 | | 4/1991 | (DE) . | |
| 9206000 | | 9/1992 | (DE) . | |
| 4300622A1 | | 7/1994 | (DE) . | |
| 19506371A1 | | 9/1995 | (DE) . | |
| 2266861A | | 11/1993 | (GB) . | |
| 57-201121 | * | 12/1982 | (JP) | 83/854 |

* cited by examiner

Primary Examiner—M. Rachuba
(74) Attorney, Agent, or Firm—Venable; Robert Kinberg

(57) ABSTRACT

The saw blade has a base body on which are mounted uncrossed teeth with cutting edges. The teeth are combined to form successive groups of at least three teeth and are disposed symmetrically to the longitudinal center plane of the base body. The teeth of one group increase in height from tooth to tooth while simultaneously decreasing in width.

10 Claims, 4 Drawing Sheets

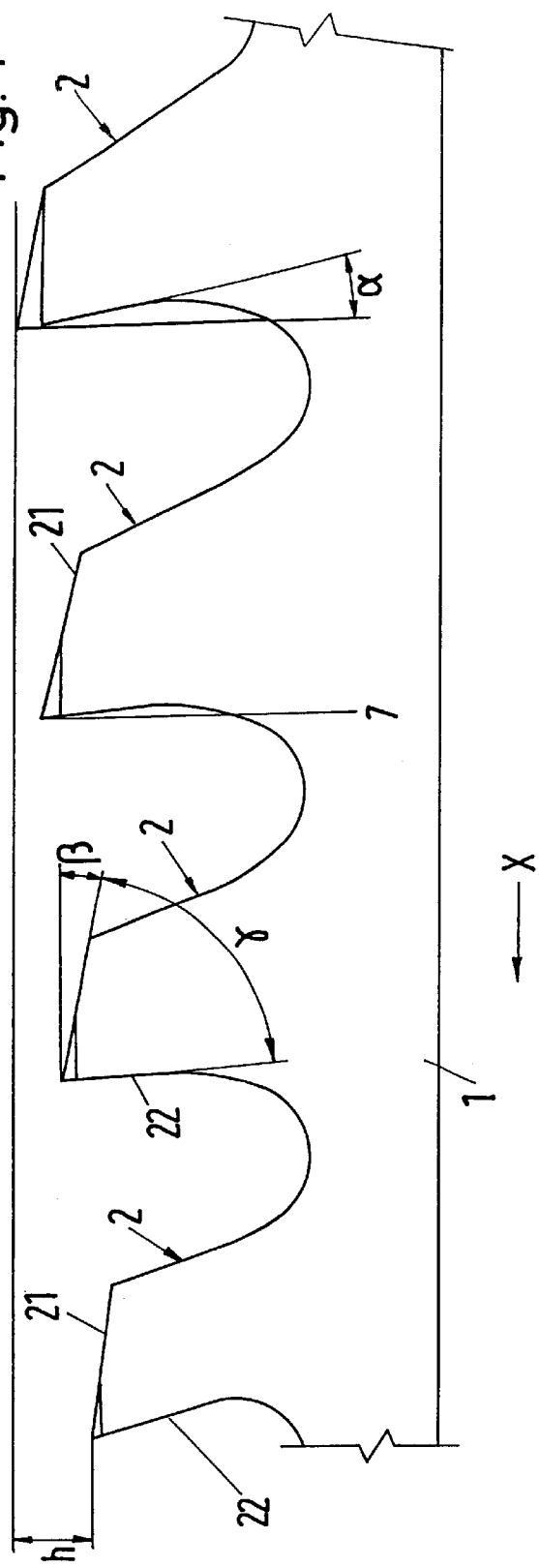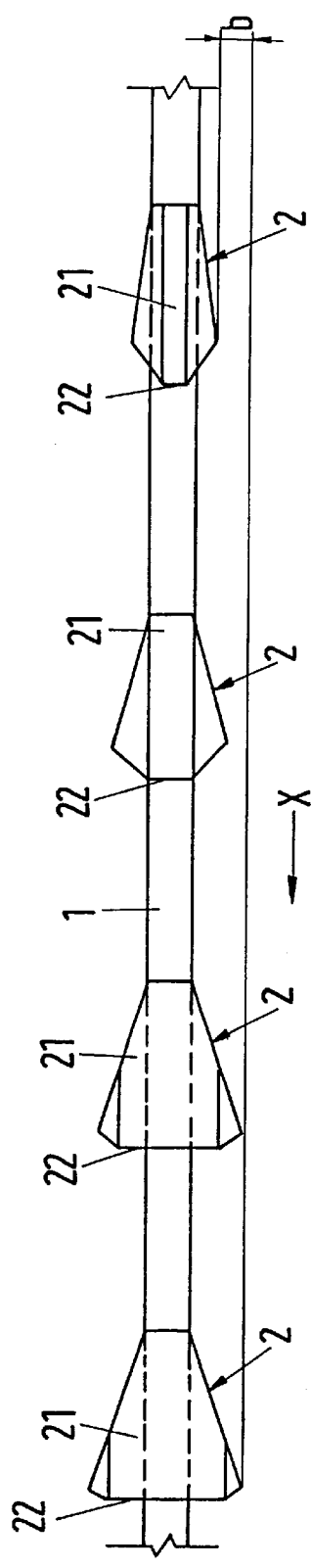

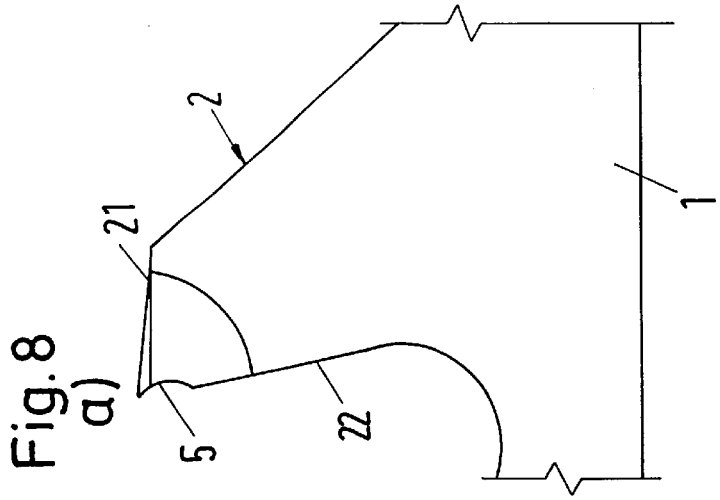
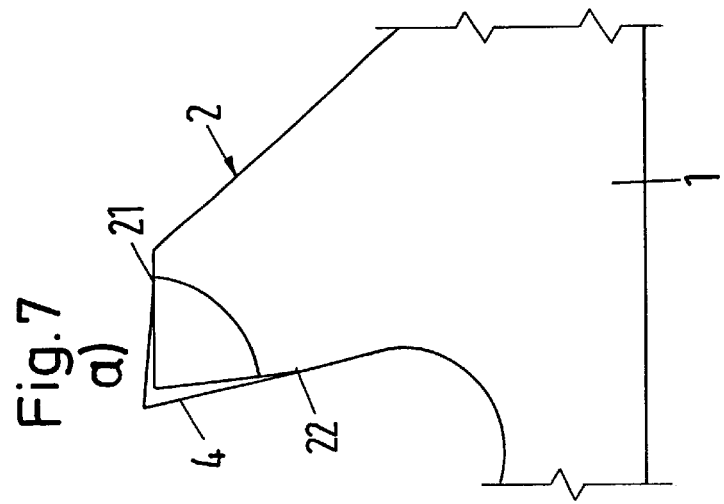
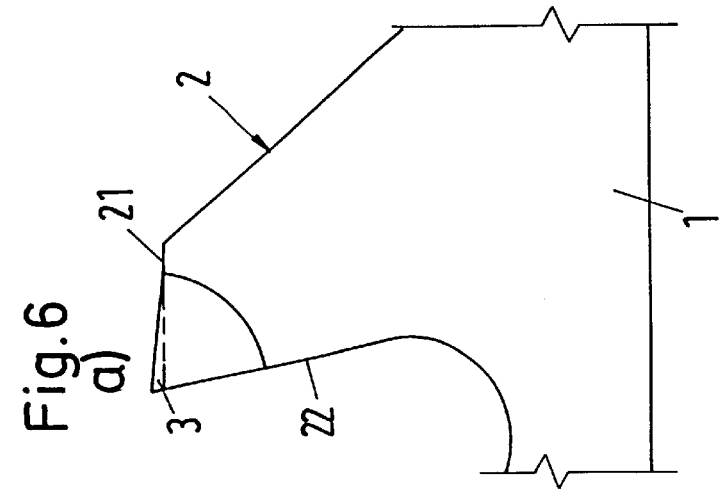

SAW BLADE

BACKGROUND OF THE INVENTION

The invention relates to a saw blade, having a base body on which are mounted uncrossed teeth with a cutting edge. The teeth are combined to form successive groups of at least three teeth and are disposed symmetrically to the longitudinal center plane of the base body.

When sawing through solid material, in particular metal, high friction and impact stresses occur at the saw teeth. Owing to the high stresses, the saw teeth are fashioned from extremely hard material. In the circular saw and band saw industry, it is standard practice to use uncrossed teeth in combination with different tooth-point forms for the precutting and re-cutting geometry to reduce the stress on the saw teeth. This principle includes successive groups of teeth, comprising 2 teeth each, of which the respectively first tooth, called the pre-cutter, is cut at a strong phase angle on the side and is somewhat longer than the following, only minimally phase-cut second tooth, called the re-cutter. A saw blade of the aforementioned type is already known (compare the DE 43 00 622 C2). At least two groups of teeth, nestled into each other, are mounted on the known saw blade. The first one of the two groups consists of at least two teeth, which decline in height from tooth to tooth while simultaneously increasing in width. The second group of teeth comprises at least two teeth, designed identically. These are the teeth with the largest width and the lowest height. The known saw blade has the disadvantage of being relatively sensitive to impact as a result of the first and at the same time highest tooth of the first group of teeth, and additionally being subject to high wear and tear.

SUMMARY OF THE INVENTION

The invention is intended to remedy this problem. It is the object of the invention to create a saw blade having a low sensitivity to impact and being subject to low wear and tear while simultaneously generating a stable movement in the cutting channel, as well as a good surface quality.

This object is solved according to the invention in that the teeth of a group increase in height from tooth to tooth while simultaneously decreasing in width.

The saw blade produced according to the invention is not susceptible to impact and is durable. In addition, the vibrations normally occurring during the sawing are reduced. The service life is increased while the cutting result is improved at the same time.

Embodiments and modifications of the invention are described in the dependent claims. One exemplary embodiment of the invention is shown in the drawings and is explained in detail in the following.

BRIEF DESCRIPTION OF THE DRAWINGS

FIG. 1 is a view from the side of a saw blade with four uniformly spaced teeth.

FIG. 2 is a view from above of the saw blade illustrated in FIG. 1.

FIG. 6a is a view from the side of a tooth with cutting separator.

FIG. 6b is a view from above of the tooth shown in FIG. 6a.

FIG. 7a is a view from the side of a tooth with roof.

FIG. 7b A view from above of the tooth shown in FIG. 7a;

FIG. 8a A view from the side of a tooth with cutting guide;

FIG. 8b A view from above of the tooth illustrated in FIG. 8a.

DETAILED DESCRIPTION OF THE PREFERRED EMBODIMENTS

Figure 5:
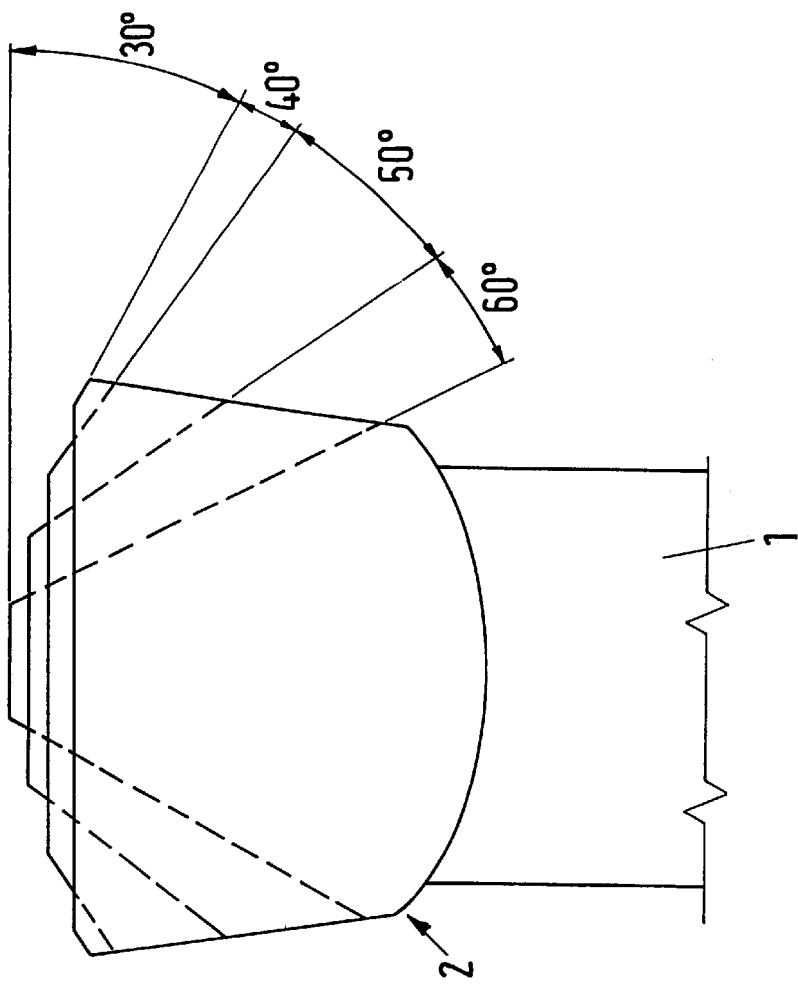
FIG. 5 is a view of a group of teeth with varied phase angles, corresponding to FIG. 3.

The saw blade selected as exemplary embodiment has a base body 1. The uncrossed teeth 2 are mounted on the base body 1. The teeth 2 are disposed to form groups of at least three teeth.

Each tooth 2 has a tooth back 21 on its end facing away from the base body 1. On the side facing the cutting direction X (FIGS. 1 and 2), each tooth 2 has a tooth front 22. The tooth front 22 is arranged at an effective cutting angle $\alpha$ to the vertical line. The effective cutting angle can vary within a tooth group, but is remains in a region that drifts in a direction counter-clockwise to the vertical line. The tooth back 21 for each tooth 2 is arranged at a clearance angle $\beta$ to the horizontal line for the saw blade. The clearance angle $\beta$ is always larger than 0°. The tooth back 21 and the tooth front 22 of each tooth 2 are always arranged at a wedge angle $\gamma$ to each other, which is in each case smaller than 90°.

Figure 3:
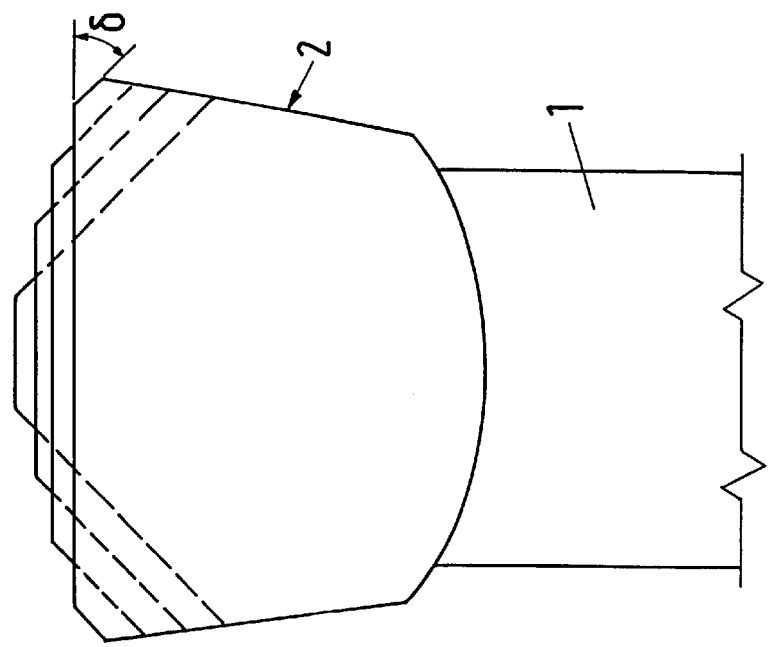
FIG. 3 shows the saw blade illustrated in FIG. 1, as seen from the left.

The teeth 2 have a phase angle $\delta$ (FIG. 3). The phase angle $\delta$ can be selected to be in the range between 5° and 60°. Also, the phase angle $\delta$ can vary from tooth to tooth within a tooth group, as is shown in the exemplary embodiment according to FIG. 5 where the phase angle $\delta$ varies between 30° and 60°.

The height h of teeth 2 that are combined to form a group of teeth increases from tooth to tooth while the width b of teeth 2 that are combined to form a group decreases at the same time. From this, it follows that the lowest tooth of a group is simultaneously the widest tooth while the highest tooth is also the narrowest one. The increase in height from tooth to tooth is at least $\frac{1}{1000}$ mm, but no more than $\frac{5}{100}$ mm. The decrease in width is designed to laterally separate a subsequently cutting tooth in the cutting channel from the pre-cutting tooth.

Figure 4:
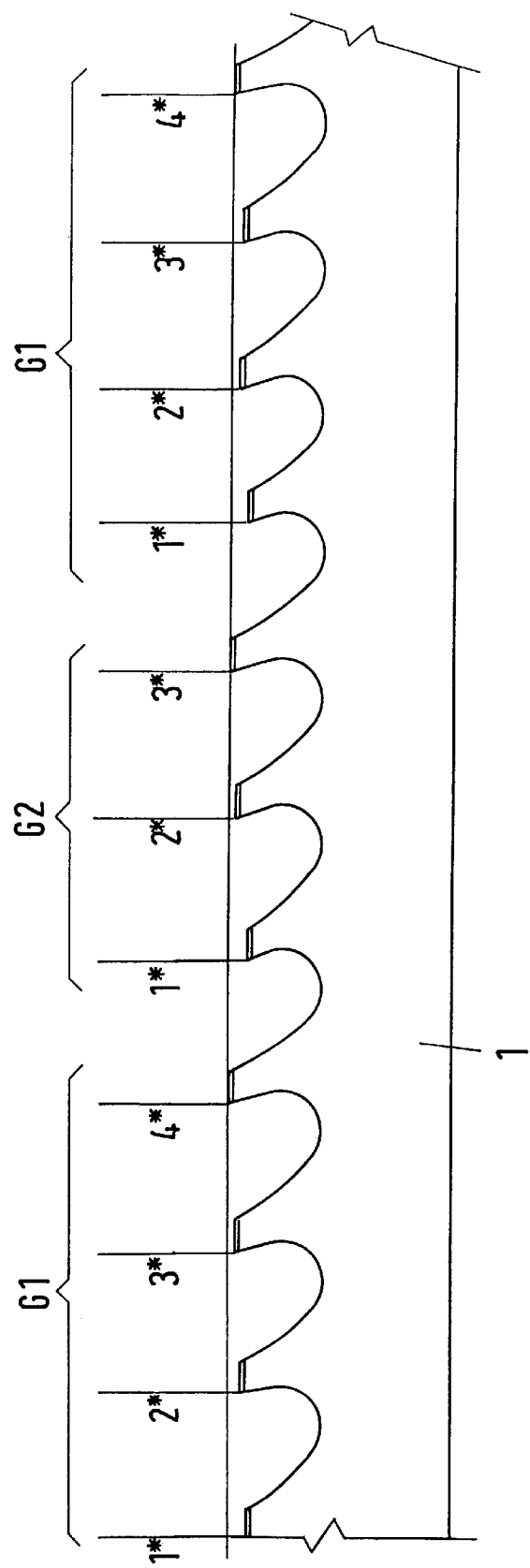
FIG. 4 is a view from the side of a section of a saw blade with two groups of teeth and varied spacing.

The teeth 2 are combined into groups of teeth comprising at least three teeth. The groups of teeth succeed each other cyclically on the saw band. It is possible in this case that identical groups of teeth respectively follow each other. It is also possible that the successive groups of teeth each have a different number of teeth (FIG. 4). In that case, a group G1, comprising four teeth, succeeds a group G2 with three teeth. The group G2 is then followed again by a group G1. The groups of teeth G1 and G2 are not nestled into each other. All groups of teeth of the saw band increase in height from tooth to tooth and decrease in width from tooth to tooth. The saw blade partition, that is to say the spacing of the teeth, can be selected to be constant or variable.

For the tooth shown in FIG. 6, a cutting divider 3 with narrow phase angle is ground into the tooth back 21 of tooth 2. The cutting divider 3 again divides the cutting or makes it smaller. The width and depth of the cutting divider 3 is 0.01 mm to 0.04 mm.

According to FIG. 7, the roof tooth 4 is arranged on the tooth front 22 of tooth 2. The roof tooth 4 is formed by grinding the tooth front 22 at an angle $\epsilon$. The angle $\epsilon$ preferably is in the range between 1 and 15°. The roof tooth 4 on tooth 2 further reduces the impact stress of the tooth on the material to be cut because only the tip of roof tooth 4 impacts with the material to be cut, thereby causing the cutting to roll over the tooth tip.

A cutting guide stage 5 is provided for the tooth illustrated in FIG. 8. The cutting guide stage 5 is formed by a radius at the end of tooth front 22, which faces away from the base body 1 of the saw blade. The radius preferably is in the range of between 0.1 and 1 mm. The cutting guide stage 5 is used for materials such as austenites. These materials have a tendency to heat up strongly during the cutting. The hot cutting rolls off into the tooth gap, where it is welded on during the cooling down and "adheres" to the spaces between the teeth when the tooth leaves the cutting channel. Upon reentering the cutting channel, there is not enough space for the following cutting. The cutting space fills up completely with cuttings, causing the tooth to leave the cutting line. The cutting guide stage 5 guides the hot cutting into a smaller radius and thus away from the surface of the cutting space. During the cooling-down phase, the cutting has no contact with the saw blade and drops off without problems upon leaving the cutting channel. The described, varied geometries can all be mutually linked. The linking of these geometries causes each tooth within a group to perform a different operation within the cutting channel. Vibrations that normally occur during the sawing are reduced or even eliminated as a result of the different forces exerted on the individual teeth during the sawing, the dividing of one cutting into several fine cuttings, and the centering of the saw band owing to the superior tooth points, which are cut at a stronger phase-angle.

What is claimed is:

1. A saw blade comprising a base body having a longitudinal central plane, and a plurality of uncrossed teeth each having a tooth front on which a cutting edge is disposed, and a tooth back, said teeth being combined into successive groups of at least three teeth and disposed symmetrically to the longitudinal center plane of the base body, wherein the teeth of a group increase in height from tooth to tooth in a direction from the tooth front to the tooth back while simultaneously decreasing in width from tooth to tooth in the direction from the tooth front to the tooth back.

2. A saw blade according to claim 1, wherein the teeth have a variable spacing between successive teeth.

3. A saw blade according to claim 1, wherein each group respectively comprises a variable number of teeth.

4. A saw blade according to claim 1, wherein the blade cuts in a cutting direction and defines a vertical direction perpendicular to the cutting direction, and each of the teeth has a cutting angle ($\alpha$) from the vertical direction, provided in a range extending towards the cutting direction from the vertical direction.

5. A saw blade according to claim 4, wherein the cutting angle ($\alpha$) varies between respective teeth within a tooth group.

6. A saw blade according to claim 1, wherein the teeth have a horizontal top surface and a pair of angled surfaces which are angled relative to the horizontal top surface by phase angles ($\delta$) in the range between 5° and 60°.

7. A saw blade according to claim 6, wherein the phase angles ($\delta$) vary between respective teeth within at least one of the tooth groups.

8. A saw blade according to claim 1, wherein the teeth each comprise a back side having a cutting divider.

9. A saw blade according to claim 1, wherein the teeth each comprise a front side having a roof tooth.

10. A saw blade according to claim 1, wherein the teeth each comprise a cutting guide stage.

* * * * *